(12) United States Patent
Gonze et al.

(10) Patent No.: US 10,161,501 B2
(45) Date of Patent: Dec. 25, 2018

(54) SYSTEM AND METHOD FOR ADJUSTING COOLANT FLOW THROUGH A COOLING SYSTEM OF A VEHICLE TO INCREASE A WARMING RATE OF A TRANSMISSION

(71) Applicant: GM Global Technology Operations LLC, Detroit, MI (US)

(72) Inventors: Eugene V. Gonze, Pickney, MI (US); Michael J. Paratore, Jr., Howell, MI (US); Sergio Quelhas, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 156 days.

(21) Appl. No.: 15/137,383

(22) Filed: Apr. 25, 2016

(65) Prior Publication Data
US 2018/0045297 A1 Feb. 15, 2018

(51) Int. Cl.
| | |
|---|---|
| F16H 57/04 | (2010.01) |
| F16K 31/02 | (2006.01) |
| B60H 1/04 | (2006.01) |
| F01P 3/20 | (2006.01) |
| F01P 7/14 | (2006.01) |
| F01P 11/08 | (2006.01) |

(52) U.S. Cl.
CPC ........... *F16H 57/0475* (2013.01); *B60H 1/04* (2013.01); *F01P 3/20* (2013.01); *F01P 7/14* (2013.01); *F01P 11/08* (2013.01); *F16H 57/0413* (2013.01); *F16H 57/0415* (2013.01); *F16K 31/025* (2013.01)

(58) Field of Classification Search
CPC . F16H 57/0475; F16H 57/0415; F16K 31/025
USPC .................................................... 123/41.08
See application file for complete search history.

(56) References Cited

U.S. PATENT DOCUMENTS

| | | | | |
|---|---|---|---|---|
| 2009/0000779 A1* | 1/2009 | Hickam | .................. | F01P 7/167 165/299 |
| 2011/0000188 A1* | 1/2011 | Pegg | ..................... | F01M 5/001 60/273 |
| 2012/0137993 A1* | 6/2012 | Kim | ........................ | F01P 7/165 123/41.11 |
| 2013/0032101 A1* | 2/2013 | Takeuchi | ................ | F01P 7/164 123/41.02 |

(Continued)

OTHER PUBLICATIONS

U.S. Appl. No. 14/956,858, filed Dec. 2, 2015, Gonze et al.

*Primary Examiner* — Joseph Dallo
*Assistant Examiner* — Yi-Kai Wang

(57) ABSTRACT

A system according to the principles of the present disclosure includes a transmission fluid temperature sensor and a coolant valve control module. The transmission fluid temperature sensor measures a temperature of transmission fluid that is circulated through a transmission. The coolant valve control module controls at least one coolant valve to adjust coolant flow from an engine to a transmission fluid heat exchanger and at least one of a radiator, an engine oil heat exchanger, and a heater core. When the transmission fluid temperature is less than a first temperature, the coolant valve control module controls the at least one coolant valve to allow coolant flow from the engine to the transmission fluid heat exchanger and prevent coolant flow from the engine to the at least one of the radiator, the engine oil heat exchanger, and the heater core.

20 Claims, 4 Drawing Sheets

(56) References Cited

U.S. PATENT DOCUMENTS

| | | | |
|---|---|---|---|
| 2014/0000536 A1* | 1/2014 | Glassford | F01P 3/20 |
| | | | 123/41.08 |
| 2014/0261254 A1* | 9/2014 | Gonze | F01P 11/08 |
| | | | 123/41.08 |
| 2014/0372008 A1* | 12/2014 | Bockenstette | F01P 7/162 |
| | | | 701/102 |
| 2017/0074130 A1* | 3/2017 | Leone | F01M 5/001 |
| 2017/0107891 A1* | 4/2017 | Murai | F01P 3/02 |
| 2017/0299045 A1* | 10/2017 | Kim | F16H 57/0417 |

\* cited by examiner

SYSTEM AND METHOD FOR ADJUSTING COOLANT FLOW THROUGH A COOLING SYSTEM OF A VEHICLE TO INCREASE A WARMING RATE OF A TRANSMISSION

FIELD

The present disclosure relates to internal combustion engines and, more specifically, to systems and methods for adjusting coolant flow through a cooling system of a vehicle to increase a warming rate of a transmission.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust air and fuel within cylinders to generate drive torque. Combustion of air and fuel also generates heat and exhaust. Exhaust produced by an engine flows through an exhaust system before being expelled to atmosphere.

Engine cooling systems typically include a radiator that is connected to coolant channels within the engine. Engine coolant circulates through the coolant channels and the radiator. The engine coolant absorbs heat from the engine and carries the heat to the radiator. The radiator transfers heat from the engine coolant to air passing the radiator. The cooled engine coolant exiting the radiator is circulated back to the engine.

SUMMARY

A system according to the principles of the present disclosure includes a transmission fluid temperature sensor and a coolant valve control module. The transmission fluid temperature sensor measures a temperature of transmission fluid that is circulated through a transmission. The coolant valve control module controls at least one coolant valve to adjust coolant flow from an engine to a transmission fluid heat exchanger and at least one of a radiator, an engine oil heat exchanger, and a heater core. When the transmission fluid temperature is less than a first temperature, the coolant valve control module controls the at least one coolant valve to allow coolant flow from the engine to the transmission fluid heat exchanger and prevent coolant flow from the engine to the at least one of the radiator, the engine oil heat exchanger, and the heater core.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Engine cooling systems typically include a coolant pump and a coolant valve. The coolant pump circulates coolant through a cooling system for an engine. The coolant valve directs the coolant to different components of the cooling system and may be used to regulate coolant flow. The components to which coolant is directed typically include a radiator, a heater core, a transmission fluid heat exchanger, and an engine oil heat exchanger.

Conventional engine control systems direct coolant to all of the components of a cooling system for an engine regardless of whether the components are warm or cold. Thus, when the components are cold, coolant heated by the engine is used to warm all of the components of the cooling system which, as noted above, may include a radiator, a heater core, a transmission fluid heat exchanger, and an engine oil heat exchanger. Therefore, the warming rate of any one of these components is limited to the warming rate of the entire cooling system.

An engine control system according to the present disclosure directs coolant from the engine to only a transmission fluid heat exchanger when one or more conditions are satisfied. In other words, the engine control system prevents coolant flow from the engine to other components of the cooling system such as a radiator, a heater core, and an engine oil heat exchanger. Thus, coolant is only circulated in a single loop that extends through the engine and the transmission fluid heat exchanger. In one example, the engine control system directs coolant from the engine to only the transmission fluid heat exchanger when the temperature of the transmission fluid is less than a first (predetermined) temperature.

Directing coolant from the engine to only the transmission fluid heat exchanger maximizes the warming rate of the transmission. Maximizing the warming rate of the transmission reduces the time required to heat the transmission to a desired temperature operating range. In turn, fuel efficiency may be improved, and the amount of emissions such as carbon dioxide emissions may be reduced.

To satisfy engine cooling requirements and cabin comfort demands, the engine control system may not direct coolant flow from the engine to only the transmission fluid heat exchanger regardless of the transmission fluid temperature if certain conditions are not satisfied. In one example, the engine control system directs coolant flow from the engine to a heater core if a cabin heater is on. In another example, the engine control system directs coolant flow from the engine to the engine oil heat exchanger if the engine oil temperature is greater than a second (predetermined) temperature.

Figure 1:
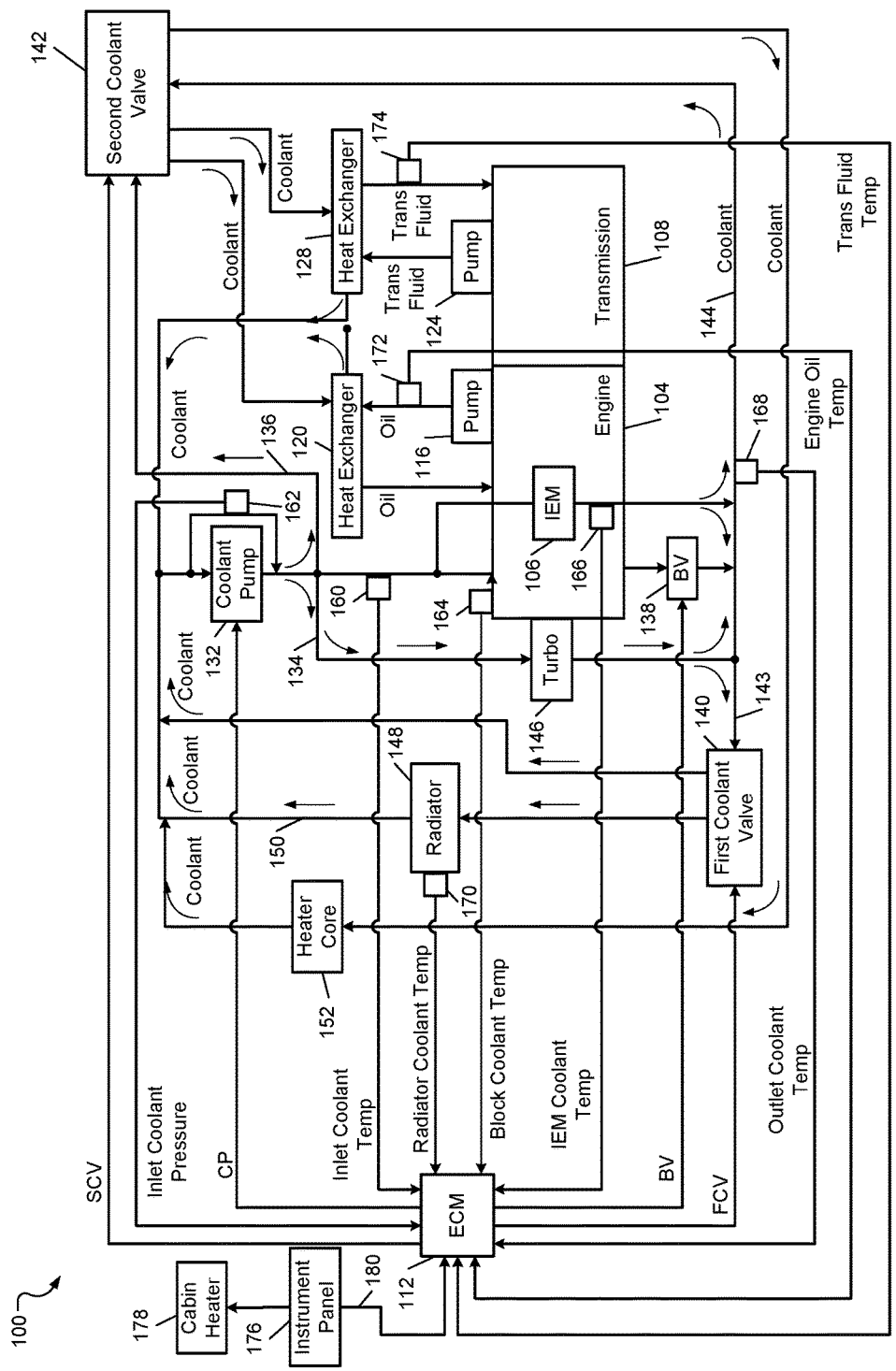
FIG. 1 is a functional block diagram of an example vehicle system according to the principles of the present disclosure.

Referring now to FIG. 1, an example vehicle system 100 includes an engine 104. The engine 104 combusts a mixture of air and fuel within cylinders to generate drive torque. An integrated exhaust manifold (IEM) 106 receives exhaust output from the cylinders and is integrated with a portion of the engine 104, such as a head portion of the engine 104.

The engine 104 outputs torque to a transmission 108. The transmission 108 transfers torque to one or more wheels of a vehicle via a driveline (not shown). An engine control module (ECM) 112 may control one or more engine actuators to regulate the torque output of the engine 104.

An engine oil pump 116 circulates engine oil through the engine 104 and a first heat exchanger 120. The first heat exchanger 120 may be referred to as an engine oil cooler or an engine oil heat exchanger. When the engine oil is cold, the first heat exchanger 120 may transfer heat to engine oil within the first heat exchanger 120 from coolant flowing through the first heat exchanger 120. When the engine oil is warm, the first heat exchanger 120 may transfer heat from the engine oil to coolant flowing through the first heat exchanger 120 and/or to air passing the first heat exchanger 120.

A transmission fluid pump 124 circulates transmission fluid through the transmission 108 and a second heat exchanger 128. The second heat exchanger 128 may be referred to as a transmission fluid cooler or a transmission fluid heat exchanger. When the transmission fluid is cold, the second heat exchanger 128 may transfer heat to transmission fluid within the second heat exchanger 128 from coolant flowing through the second heat exchanger 128. When the transmission fluid is warm, the second heat exchanger 128 may transfer heat from the transmission fluid to coolant flowing through the second heat exchanger 128 and/or to air passing the second heat exchanger 128.

The engine 104 includes a plurality of channels through which engine coolant ("coolant") can flow. For example, the engine 104 may include one or more channels through the head portion of the engine 104, one or more channels through a block portion of the engine 104, and/or one or more channels through the IEM 106.

A coolant pump 132 pumps coolant to various channels when the coolant pump 132 is on. While the coolant pump 132 is shown and will be discussed as an electric coolant pump, the coolant pump 132 may alternatively be mechanically driven (e.g., by the engine 104) or another suitable type of variable output coolant pump. In various implementations, the coolant pump 132 may also pump coolant to a first flow path 134 and/or a second flow path 136.

In various implementations, a block valve (BV) 138 may regulate coolant flow out of (and therefore through) the block portion of the engine 104. Coolant output from the engine 104 flows to a first coolant valve 140 and a second coolant valve 142. Coolant output from the engine 104 includes coolant output from the block portion of the engine 104, coolant output from the head portion of the engine 104, and/or coolant output from the IEM 106. Coolant flows from the engine 104 to the first coolant valve 140 via a third flow path 143. Coolant flows from the engine 104 to the second coolant valve 142 via a fourth flow path 144. Coolant may also flow directly from the coolant pump 132 to the second coolant valve 142 via the second flow path 136.

Various types of engines may include one or more turbochargers, such as turbocharger 146. Coolant may be circulated through a portion of the turbocharger 146, for example, to cool the turbocharger 146. The coolant pump 132 may provide coolant to the turbocharger 146 via the first flow path 134. Coolant output from the turbocharger 146 also flows to the first coolant valve 140 and the second coolant valve 142.

The first coolant valve 140 regulates coolant flow to (and therefore through) a third heat exchanger 148. The third heat exchanger 148 may be referred to as a radiator. The third heat exchanger 148 transfers heat to air passing the third heat exchanger 148. A cooling fan (not shown) may be implemented to increase airflow passing the third heat exchanger 148. Coolant output from the third heat exchanger 148 flows to the coolant pump 132.

The first coolant valve 140 may also regulate coolant flow to (and therefore through) a bypass flow path 150. The bypass flow path 150 extends from the first coolant valve 140 to location downstream of the third heat exchanger 148 and upstream from the coolant pump 132 as shown in FIG. 1. Thus, the bypass flow path 150 bypasses the third heat exchanger 148.

The second coolant valve 142 regulates coolant flow to (and therefore through) the first heat exchanger 120 and the second heat exchanger 128. The second coolant valve 142 may also regulate coolant flow to (and therefore through) a fourth heat exchanger 152. The fourth heat exchanger 152 may also be referred to as a heater core. Air may be circulated past the fourth heat exchanger 152, for example, to warm a passenger cabin of the vehicle.

An inlet coolant temperature (ICT) sensor 160 measures a temperature of coolant input to (or on an inlet side of) the engine 104. An inlet coolant pressure (ICP) sensor 162 measures a pressure of coolant input to (or on an inlet side of) the engine 104. The coolant pump 132 may be disposed in a first coolant line, the ICP sensor 162 may be disposed in a second coolant line, and coolant may flow through the first and second coolant lines in parallel as shown.

A block coolant temperature (BCT) sensor 164 measures a temperature of coolant flowing through the block portion of the engine 104. An IEM coolant temperature (ICT) sensor 166 measures a temperature of coolant output from the IEM 106. An outlet coolant temperature (OCT) sensor 168 measures a temperature of coolant output from (or on an outlet side of) the engine 104.

A radiator coolant temperature (RCT) sensor 170 measures a temperature of coolant flowing through the third heat exchanger (or radiator) 148. An engine oil temperature (EOT) sensor 172 measures a temperature of engine oil circulated through the first heat exchanger 120. A transmission fluid temperature (TFT) sensor 174 measures a temperature of transmission fluid circulated through the second heat exchanger 148. An instrument panel 176 controls a cabin heater 178 based on user input and generates a signal 180 indicating whether the cabin heater 178 is on or off.

The ECM 112 controls actuation of the block valve 138 and the first and second coolant valves 140 and 142, and controls the output of the coolant pump 132, based on various vehicle operating conditions such as those measured by the sensors 160-174. The components of the vehicle system 100 through which coolant flows may collectively be referred to as a cooling system. Thus, the first, second, third, and fourth heat exchangers 120, 128, 148, and 152, the coolant pump 132, the block valve 138, the first and second coolant valves 140 and 142, and the coolant lines that extend between these components may collectively be referred to as the cooling system.

When the engine 104 and/or the transmission 108 are cool, the ECM 112 may control actuation of the first and second coolant valves 140 and 142 such that coolant output from the engine 104 is allowed to flow only to the second heat exchanger 128. In other words, the ECM 112 may adjust the first and second coolant valves 140 and 142 to positions such that coolant is circulated through only the engine 104 and the second heat exchanger 128. Thus, in these positions, the first and second coolant valves 140 and 142 may prevent coolant flow from the engine 104 to the first heat exchanger 120, the third heat exchanger 148, and the fourth heat exchanger 152. Circulating coolant through the cooling system in this manner increases a warming rate of the transmission 108, which improves fuel economy.

Figure 2A:
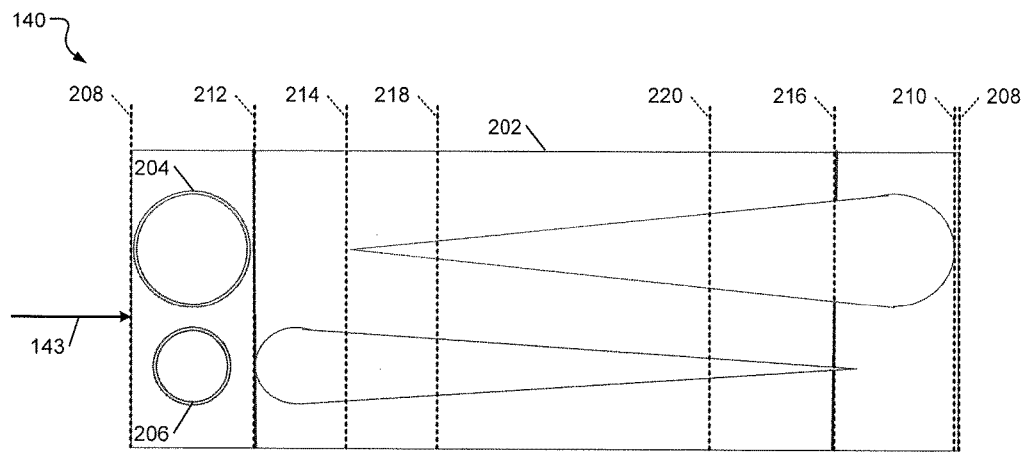
FIGS. 2A and 2B are example diagrams illustrating coolant flow to and from coolant valves at various positions of the coolant valves.
Figure 2B:
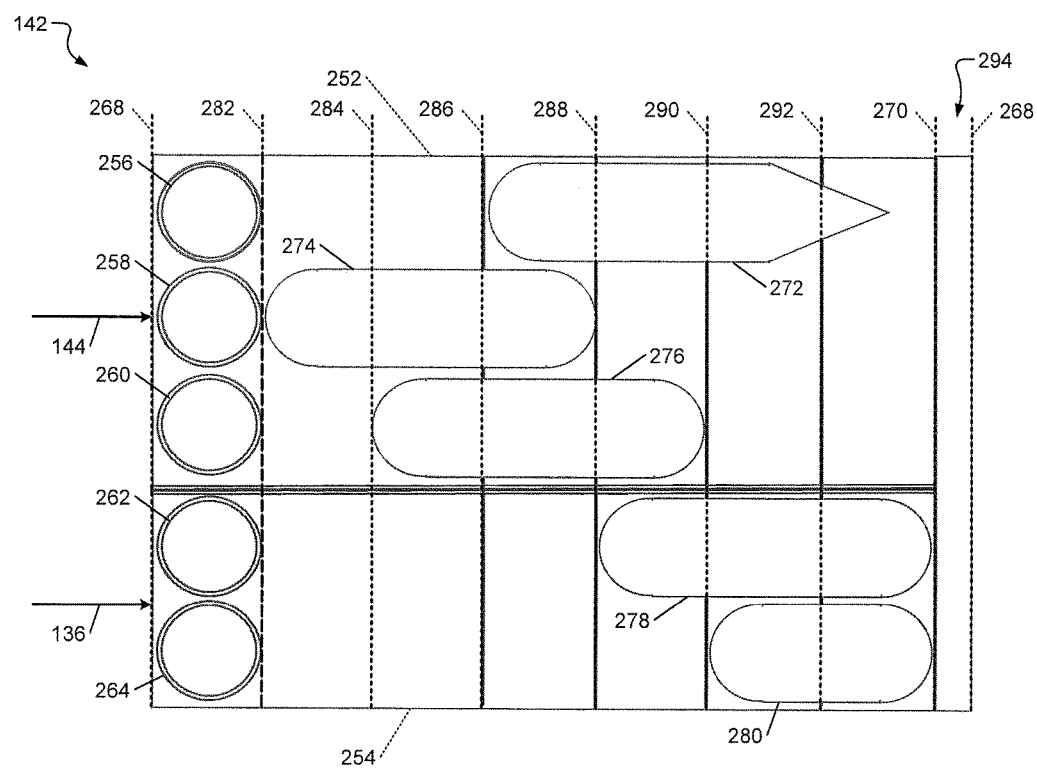
Figure 3:
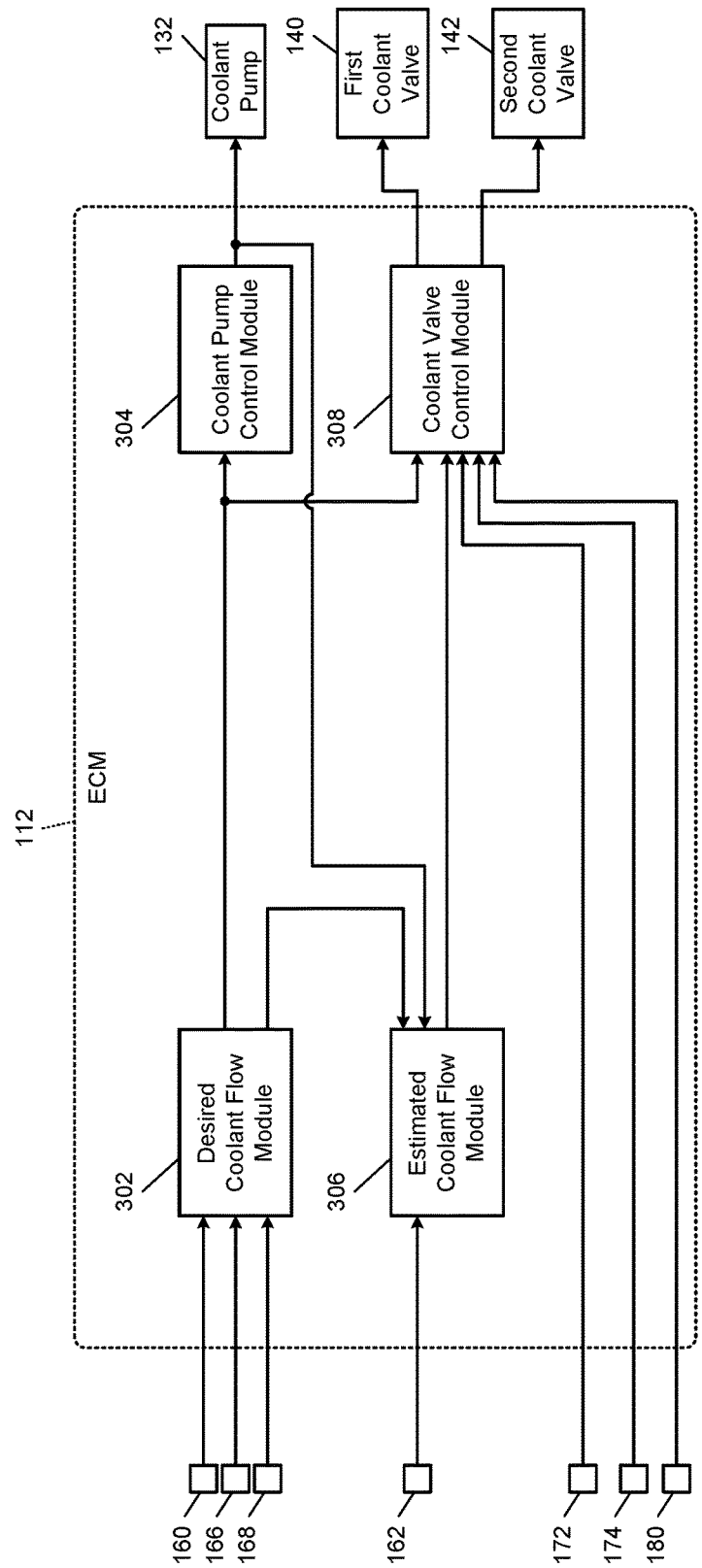
FIG. 3 is a functional block diagram of an example control system according to the principles of the present disclosure.

Each of the first and second coolant valves 140 and 142 may be a multiple input, multiple output valve and/or may include one or more other suitable valves. In various implementations, the first and second coolant valves 140 and 142 may be replaced with a single multiple input, multiple output valve. In addition, the first coolant valve 140 and/or the second coolant valve 142 may be partitioned and have one or more separate valve chambers. FIG. 2 illustrates coolant flow to and from an example of the first coolant valve 140 where the first coolant valve 140 includes a single valve chamber. FIG. 3 illustrates coolant flow to and from an example of the second coolant valve 142 where the second coolant valve 142 includes two valve chambers.

Referring now to FIGS. 1 and 2, the first coolant valve 140 includes a single valve chamber 202 that receives coolant from the outlet side of the engine 104 via the third flow path 143 and has a first outlet 204 and a second outlet 206. In one example, the first outlet 204 has an inner diameter of 40 millimeters (mm), and the second outlet 206 has an inner diameter of 20 mm. Coolant output through the first outlet 204 flows to the third heat exchanger (or radiator) 148. Coolant output through the second outlet 206 flows to the bypass flow path 150.

The first coolant valve 140 can be rotated between two end positions 208 and 210. Although the first coolant valve 140 may be spherical or cylindrical, FIG. 2 depicts the first coolant valve 140 as flat for illustration purposes only. Since the first coolant valve 140 is illustrated in this manner, the end position 208 appears twice in FIG. 2 even though the end position 208 is actually a single rotational position of the first coolant valve 140. The end position 208 shown on the left side of FIG. 2 corresponds to a valve position of 0 degrees. The end position 208 shown on the right side of FIG. 2 corresponds to a valve position of 360 degrees.

The first coolant valve 140 can be rotated to various positions between the end positions 208 and 210 to adjust the amount of coolant flow through the first and second outlets 204 and 206. The amount of coolant flow through the first outlet 204 to the radiator 148 is illustrated at 212. The amount of coolant flow through the second outlet 206 to the bypass flow path 150 is illustrated at 214.

When the first coolant valve 140 is positioned between the end position 208 and a first position 212, coolant flow through the first and second outlets 204 and 206 is blocked. Thus, the positions between the end position 208 and the first position 212 may be referred to as zero flow positions since no coolant flow to the radiator 148 or the bypass flow path 150 is allowed in these positions.

When the first coolant valve 140 is positioned between the first position 212 and a second position 214, coolant flow through the first outlet 204 is blocked, and coolant flow through the second outlet 206 is allowed. Thus, the positions between the first and second positions 212 and 214 may be referred to as full bypass positions since, when in these positions, the first coolant valve 140 directs all coolant flow therethrough to the bypass flow path 150. The ECM 112 may actuate the first coolant valve 140 to a full bypass position to warm the engine oil, the transmission fluid, and/or coolant flowing through the fourth heat exchanger (or heater core) 152.

When the first coolant valve 140 is positioned between the second position 214 and a third position 216, coolant is allowed to flow through both the first and second outlets 204 and 206. The amount of coolant that is allowed to flow through the first and second outlets 204 and 206 varies as the first coolant valve 140 is adjusted from the second position 214 to the third position 216 and vice versa. For example, when the first coolant valve 140 is positioned at a fourth position 218, the amount of coolant allowed to flow through the second outlet 206 is greater than the amount of coolant allowed to flow through the first outlet 204. Conversely, when the first coolant valve 140 is positioned at a fifth position 220, the amount of coolant allowed to flow through the second outlet 206 is less than the amount of coolant allowed to flow through the first outlet 204.

When the first coolant valve 140 is positioned between the third position 216 and the end position 210, coolant flow through the first outlet 204 is allowed, and coolant flow through the second outlet 206 is blocked. Thus, the positions between the third position 216 and the end position 210 may be referred to as full radiator positions since, when in these positions, the first coolant valve 140 directs all coolant flow therethrough to the radiator 148. The ECM 112 may actuate the first coolant valve 140 to a full radiator position to cool the engine oil and/or the transmission fluid.

Referring now to FIGS. 1 and 3, the second coolant valve 142 includes a first valve chamber 252 and a second valve chamber 254. The first valve chamber 252 receives coolant from the outlet side of the engine 104 via the third flow path 144 and has a first outlet 256, a second outlet 258, and a third outlet 260. In one example, each of the first, second, and third outlets 256, 258, and 260 has an outer diameter of 20 mm. Coolant output through the first outlet 256 flows to the heater core 152. Coolant output through the second outlet 258 flows to the second heat exchanger (or transmission fluid heat exchanger) 128. Coolant output through the third outlet 260 flows to the first heat exchanger (or engine oil heat exchanger) 120.

The second valve chamber 254 receives coolant directly from the coolant pump 132 via the second flow path 136 and has a first outlet 262 and a second outlet 264. In one example, each of the first and second outlets 262 and 264 has an outer diameter of 20 mm. Coolant output through the first outlet 262 flows to the transmission fluid heat exchanger 128. Coolant output through the second outlet 264 flows to the engine oil heat exchanger 120.

The second coolant valve 142 can be rotated between two end positions 268 and 270. Although the second coolant valve 142 may be spherical or cylindrical, FIG. 3 depicts the second coolant valve 142 as flat for illustration purposes only. Since the second coolant valve 142 is illustrated in this manner, the end position 268 appears twice in FIG. 3 even though the end position 268 is actually a single rotational position of the second coolant valve 142. The end position 268 shown on the left side of FIG. 3 corresponds to a valve position of 0 degrees. The end position 268 shown on the right side of FIG. 3 corresponds to a valve position of 360 degrees.

The second coolant valve 142 can be rotated to various positions between the end positions 268 and 270 to adjust the amount of coolant flow through the first, second, and third outlets 256, 258, and 260 of the first valve chamber 252. The amount of coolant flow through the first outlet 256 to the heater core 152 is illustrated at 272. The amount of coolant flow through the second outlet 258 to the transmission fluid heat exchanger 128 is illustrated at 274. The amount of coolant flow through the third outlet 260 to the engine oil heat exchanger 120 is illustrated at 276.

The second coolant valve 142 can also be rotated to various positions between the end positions 268 and 270 to adjust the amount of coolant flow through the first and second outlets 262 and 264 of the second valve chamber 254. The amount of coolant flow through the first outlet 262 to the transmission fluid heat exchanger 128 is illustrated at 278. The amount of coolant flow through the second outlet 264 to the engine oil heat exchanger 120 is illustrated at 280.

When the second coolant valve 142 is positioned between the end position 268 and a first position 282, coolant flow through the first outlet 256 is allowed, and coolant flow through all other outlets of the second coolant valve 142 is blocked. The ECM 112 may actuate the second coolant valve 142 to a position between the end position 268 and the first position 282 to warm the coolant flowing through the heater core 152. When the second coolant valve 142 is positioned between the first position 282 and a second position 284, coolant flow through the second outlet 258 is allowed, and coolant flow through all other outlets of the second coolant valve 142 is blocked. The ECM 112 may actuate the second coolant valve 142 to a position between the first and second positions 282 and 284 to warm the transmission fluid.

When the second coolant valve 142 is positioned between the second position 284 and a third position 286, coolant flow through the second and third outlets 258 and 260 is allowed, and coolant flow through all other outlets of the second coolant valve 142 is blocked. The ECM 112 may actuate the second coolant valve 142 to a position between the second and third positions 284 and 286 to warm the transmission fluid and the engine oil. When the second coolant valve 142 is positioned between the third position 286 and a fourth position 288, coolant flow through all outlets of the first valve chamber 252 is allowed, and coolant flow through all outlets of the second valve chamber 254 is blocked. The ECM 112 may actuate the second coolant valve 142 to a position between the third and fourth positions 286 and 288 to warm the transmission fluid, the engine oil, and the coolant flowing through the heater core 152.

When the second coolant valve 142 is positioned between the fourth position 288 and a fifth position 290, coolant flow through the first and third outlets 256 and 260 of the first valve chamber 252 is allowed, and coolant flow through the second outlet 258 of the first valve chamber 252 is blocked. In addition, coolant flow through the first outlet 262 of the second valve chamber 254 is allowed, and coolant flow through the second outlet 264 of the second valve chamber 254 is blocked. The ECM 112 may actuate the second coolant valve 142 to a position between the fourth and fifth positions 288 and 290 to warm the engine oil and coolant flowing through the heater core 152, and to cool the transmission fluid.

When the second coolant valve 142 is positioned between the fifth position 290, and a sixth position 292, coolant flow through the first outlet 256 of the first valve chamber 252 is allowed, and coolant flow through the second and third outlets 258 and 260 of the first valve chamber 252 is blocked. In addition, coolant flow through all outlets of the second valve chamber 254 is allowed. The ECM 112 may actuate the second coolant valve 142 to a position between the fifth and sixth positions 290 and 292 to warm coolant flowing through the heater core 152, and to cool the transmission fluid and the engine oil.

When the second coolant valve 142 is positioned between the sixth position 292 and the end position 270, coolant flow through all outlets of the first valve chamber 252 is blocked, and coolant flow through all outlets of the second valve chamber 254 is allowed. The ECM 112 may actuate the second coolant valve 142 to a position between the sixth position 292 and the end position 270 to maximize cooling of the transmission fluid and the engine oil. The ECM 112 may attempt to actuate the second coolant valve 142 to a position within a predetermined range 294 defined between the end position 270 and the end position 268, for example, when performing one or more cooling system diagnostics.

Referring now to FIG. 3, an example implementation of the ECM 112 includes a desired coolant flow module 302, a coolant pump control module 304, an estimated coolant flow module 306, and a coolant valve control module 308. The desired coolant flow module 302 determines a desired rate of coolant flow through the cooling system of the vehicle system 100. The desired coolant flow module 302 may determine the desired coolant flow rate based on the inlet coolant temperature from the ICT sensor 160, the outlet coolant temperature from the OCT sensor 168, and/or the IEM coolant temperature from the ICT sensor 166. For example, the desired coolant flow module 302 may adjust the desired coolant flow rate to minimize a difference between (i) one or more of the inlet coolant temperature, the outlet coolant temperature, and the IEM coolant temperature, and (ii) a target coolant temperature. The desired coolant flow module 302 outputs the desired coolant flow rate.

The coolant pump control module 304 controls the speed of the coolant pump 132 based on the desired coolant flow rate. The coolant pump control module 304 may determine a desired pump speed based on the desired coolant flow rate. The coolant pump control module 304 may output a signal instructing the coolant pump 132 to achieve the desired pump speed.

The estimated coolant flow module 306 estimates the rate of coolant flow through the cooling system based on, for example, the inlet coolant pressure measured by the ICP sensor 162 and the desired coolant pump speed. For example, the estimated coolant flow module 306 may estimate the rate of coolant flow through the cooling system based on a predetermined relationship between coolant pump speed, inlet coolant pressure, and the coolant flow. This predetermined relationship may be embodied in a lookup table and/or an equation. In various implementations, a measured coolant pump speed may be used in place of the desired coolant pump speed. The estimated coolant flow module 306 outputs the estimated coolant flow rate.

The coolant valve control module 308 controls the positions of the first and second coolant valves 140 and 142. The coolant valve control module 308 may control the positions of the first and second coolant valves 140 and 142 based on the engine oil temperature measured by the EOT sensor 172, the transmission fluid temperature measured by the TFT sensor 174, and/or the signal 180 indicating whether the cabin heater 178 is on or off. Additionally or alternatively, the coolant valve control module 308 may control the positions of the first and second coolant valves 140 and 142 based on the estimated coolant flow rate output and/or a measured rate of coolant flow through the cooling system.

Figure 4:
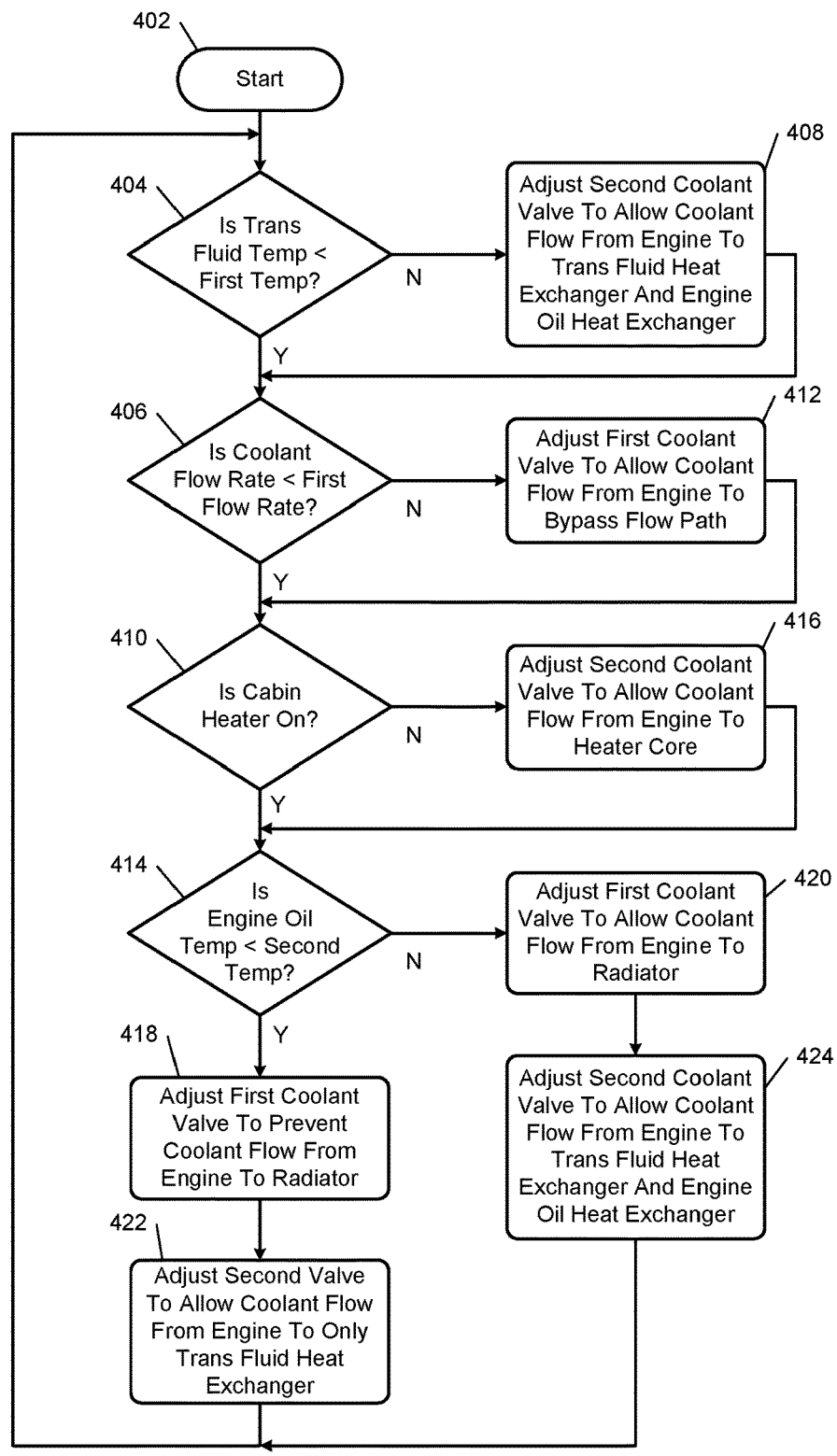
FIG. 4 is a flowchart illustrating an example control method according to the principles of the present disclosure.

Referring now to FIG. 4, a method for adjusting the positions of the first and second valves 140 and 142 begins at 402. The method is described in the context of the modules included in the example implementation of the ECM 112 shown in FIG. 4. However, the particular modules that perform the steps of the method may be different than the modules mentioned below and/or the method may be implemented apart from the modules of FIG. 4.

At 404, the coolant valve control module 308 determines whether the transmission fluid temperature measured by the TFT sensor 174 is less than a first temperature (e.g., 90 degrees Celsius). The first temperature may be predetermined. If the transmission fluid temperature is less than the first temperature, the method continues at 406. Otherwise, the method continues at 408.

At 408, the coolant valve control module 308 adjusts the position of the second coolant valve 142 to allow coolant flow from the engine 104 to the transmission fluid heat exchanger 128 and the engine oil heat exchanger 120. For example, referring briefly to FIG. 2B, the coolant valve control module 308 may adjust the second coolant valve 142 to a position between the second and third positions 284 and 286. In addition, referring briefly to FIG. 2A, the coolant valve control module 308 may adjust the first coolant valve 140 to a position between the second position 214 and the end position 210 to allow coolant to flow to the radiator 148.

At 406, the coolant valve control module 308 determines whether the rate of coolant flow through the cooling system is less than a first rate (e.g., 20 liters per minute). The coolant flow rate may be estimated (e.g., by the estimated coolant flow module 306) or measured. The first rate may be predetermined. If the coolant flow rate is less than the first rate, the method continues at 410. Otherwise, the method continues at 412.

At 410, the coolant valve control module 308 adjusts the position of the first coolant valve 140 to allow coolant to flow from the engine 104 to the bypass flow path 150. For example, referring briefly to FIG. 2A, the coolant valve control module 308 may adjust the first coolant valve 140 to a position between the first and third positions 212 and 216. At 414, the coolant valve control module 308 determines whether the cabin heater 178 is on based on, for example, the signal 180 that is output by the instrument panel 176. If the cabin heater 178 is on, the method continues at 414. Otherwise, the method continues at 416.

At 416, the coolant valve control module 308 adjusts the position of the second coolant valve 142 to allow coolant to flow from the engine 104 to the heater core 152. For example, referring briefly to FIG. 2A, the coolant valve control module 308 may adjust the first coolant valve 140 to a position between the end position 268 and the first position 282 or to a position between the third position 286 and the sixth position 292. At 414, the coolant valve control module 308 determines whether the engine oil temperature measured by the EOT sensor 172 is less than a second temperature (e.g., 130 degrees Celsius). The second temperature may be predetermined. If the engine oil temperature is less than the second temperature, the method continues at 418. Otherwise, the method continues at 420.

At 418, the coolant valve control module 308 adjusts the first coolant valve 140 to prevent coolant flow from the engine 104 to the radiator 148. For example, referring briefly to FIG. 2A, the coolant valve control module 308 may adjust the first coolant valve 140 to a position between the end position 208 and the second position 214. At 422, the coolant valve control module 308 adjusts the second coolant valve 142 to allow coolant flow from the engine 104 to only the transmission fluid heat exchanger 128. For example, referring briefly to FIG. 2B, the coolant valve control module 308 may adjust the second coolant valve 142 to a position between the first and second positions 282 and 284.

At 420, the coolant valve control module 308 adjusts the first coolant valve 140 to allow coolant flow from the engine 104 to the radiator 148. For example, referring briefly to FIG. 2A, the coolant valve control module 308 may adjust the first coolant valve 140 to a position between the second position 214 and the end position 210. At 424, the coolant valve control module 308 adjusts the second coolant valve 142 to allow coolant flow from the engine 104 to the transmission fluid heat exchanger 128 and the engine oil heat exchanger 120. For example, referring briefly to FIG. 2B, the coolant valve control module 308 may adjust the second coolant valve 142 to a position between the fifth position 290 and the end position 270.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a transmission fluid temperature sensor that measures a temperature of transmission fluid that is circulated through a transmission; and
a coolant valve control module that:
controls at least one coolant valve to adjust coolant flow from an engine to a transmission fluid heat exchanger and at least one of a radiator, an engine oil heat exchanger, and a heater core;
when the transmission fluid temperature is less than a first temperature, controls the at least one coolant valve to allow coolant flow from the engine to the transmission fluid heat exchanger and prevent coolant flow from the engine to the heater core;
controls the at least one coolant valve to prevent coolant flow from the engine to the engine oil heat exchanger when an engine oil temperature is less than a second temperature; and
controls the at least one coolant valve to allow coolant flow from the engine to the engine oil heat exchanger when the engine oil temperature is greater than or equal to the second temperature.

2. The system of claim 1 wherein, when the transmission fluid temperature is less than the first temperature, the coolant valve control module controls the at least one coolant valve to allow coolant flow from the engine to the transmission fluid heat exchanger and prevent coolant flow from the engine to the radiator, the engine oil heat exchanger, and the heater core.

3. The system of claim 1 wherein, when the transmission fluid temperature is less than the first temperature, the coolant valve control module controls the at least one coolant valve to allow coolant flow from the engine to only the transmission fluid heat exchanger.

4. The system of claim 1 wherein the coolant valve control module controls the at least one coolant valve to allow coolant flow from the engine to the transmission fluid heat exchanger and the engine oil heat exchanger when the transmission fluid temperature is greater than or equal to the first temperature.

5. The system of claim 1 wherein the coolant valve control module:
controls the at least one coolant valve to prevent coolant flow from the engine to a bypass flow path when a coolant flow rate is less than a first rate, wherein the bypass flow path extends from the at least one coolant valve to a location downstream of the radiator and thereby bypasses the radiator; and
controls the at least one coolant valve to allow coolant flow from the engine to the bypass flow path when the coolant flow rate is greater than or equal to the first rate.

6. The system of claim 1 wherein the coolant valve control module:
controls the at least one coolant valve to prevent coolant flow from the engine to the heater core when a cabin heater is off; and
controls the at least one coolant valve to allow coolant flow from the engine to the heater core when the cabin heater is on.

7. The system of claim 1 wherein the at least one coolant valve includes:

a first coolant valve that regulates coolant flow from the engine to the radiator; and a second coolant valve that regulates coolant flow from the engine to the transmission fluid heat exchanger and the engine oil heat exchanger.

8. The system of claim 7 wherein, when the engine oil temperature is less than the second temperature, the coolant valve control module:

adjusts the first coolant valve to prevent coolant flow from the engine to the radiator; and controls the second coolant valve to allow coolant flow from the engine to the transmission fluid heat exchanger and prevent coolant flow from the engine to the engine oil heat exchanger.

9. The system of claim 8 wherein, when the engine oil temperature is greater than or equal to the second temperature, the coolant valve control module:

adjusts the first coolant valve to allow coolant flow from the engine to the radiator; and controls the second coolant valve to allow coolant flow from the engine to the transmission fluid heat exchanger and the engine oil heat exchanger.

10. A method comprising:

measuring a temperature of transmission fluid that is circulated through a transmission;

controlling at least one coolant valve to adjust coolant flow from an engine to a transmission fluid heat exchanger and at least one of a radiator, an engine oil heat exchanger, and a heater core;

when the transmission fluid temperature is less than a first temperature, controlling the at least one coolant valve to allow coolant flow from the engine to the transmission fluid heat exchanger and prevent coolant flow from the engine to the heater core;

controlling the at least one coolant valve to prevent coolant flow from the engine to the engine oil heat exchanger when an engine oil temperature is less than a second temperature; and controlling the at least one coolant valve to allow coolant flow from the engine to the engine oil heat exchanger when the engine oil temperature is greater than or equal to the second temperature.

11. The method of claim 10 further comprising, when the transmission fluid temperature is less than the first temperature, controlling the at least one coolant valve to allow coolant flow from the engine to the transmission fluid heat exchanger and prevent coolant flow from the engine to the radiator, the engine oil heat exchanger, and the heater core.

12. The method of claim 10 further comprising, when the transmission fluid temperature is less than the first temperature, controlling the at least one coolant valve to allow coolant flow from the engine to only the transmission fluid heat exchanger.

13. The method of claim 10 further comprising controlling the at least one coolant valve to allow coolant flow from the engine to the transmission fluid heat exchanger and the engine oil heat exchanger when the transmission fluid temperature is greater than or equal to the first temperature.

14. The method of claim 10 further comprising:

controlling the at least one coolant valve to prevent coolant flow from the engine to a bypass flow path when a coolant flow rate is less than a first rate, wherein the bypass flow path extends from the at least one coolant valve to a location downstream of the radiator and thereby bypasses the radiator; and controlling the at least one coolant valve to allow coolant flow from the engine to the bypass flow path when the coolant flow rate is greater than or equal to the first rate.

15. The method of claim 10 further comprising:

controlling the at least one coolant valve to prevent coolant flow from the engine to the heater core when a cabin heater is off; and controlling the at least one coolant valve to allow coolant flow from the engine to the heater core when the cabin heater is on.

16. The method of 10 wherein the at least one coolant valve includes:

a first coolant valve that regulates coolant flow from the engine to the radiator; and a second coolant valve that regulates coolant flow from the engine to the transmission fluid heat exchanger and the engine oil heat exchanger.

17. The method of claim 16 further comprising, when the engine oil temperature is less than the second temperature, executing the following steps:

adjusting the first coolant valve to prevent coolant flow from the engine to the radiator; and controlling the second coolant valve to allow coolant flow from the engine to the transmission fluid heat exchanger and prevent coolant flow from the engine to the engine oil heat exchanger.

18. The method of claim 17 further comprising, when the engine oil temperature is greater than or equal to the second temperature, executing the following steps:

adjusting the first coolant valve to allow coolant flow from the engine to the radiator; and controlling the second coolant valve to allow coolant flow from the engine to the transmission fluid heat exchanger and the engine oil heat exchanger.

19. The system of claim 1 wherein, as long as the transmission fluid temperature is less than the first temperature and the engine oil temperature is less than the second temperature, the coolant valve control module controls the at least one coolant valve to allow coolant flow from the engine to the transmission fluid heat exchanger and prevent coolant flow from the engine to the engine oil heat exchanger.

20. The method of claim 10 further comprising, as long as the transmission fluid temperature is less than the first temperature and the engine oil temperature is less than the second temperature, controlling the at least one coolant valve to allow coolant flow from the engine to the transmission fluid heat exchanger and prevent coolant flow from the engine to the engine oil heat exchanger.

* * * * *